US008488841B2

(12) United States Patent
Lee et al.

(10) Patent No.: US 8,488,841 B2
(45) Date of Patent: Jul. 16, 2013

(54) SEARCHLIGHT CONTROL APPARATUS AND METHOD

(75) Inventors: Hou-Hsien Lee, Tu-Cheng (TW); Chang-Jung Lee, Tu-Cheng (TW); Chih-Ping Lo, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 260 days.

(21) Appl. No.: 13/085,435

(22) Filed: Apr. 12, 2011

(65) Prior Publication Data

US 2012/0020098 A1 Jan. 26, 2012

(30) Foreign Application Priority Data

Jul. 21, 2010 (TW) ............................... 99123896 A

(51) Int. Cl.
*G06K 9/00* (2006.01)
*G06F 19/00* (2006.01)

(52) U.S. Cl.
USPC ............................ 382/103; 382/291; 700/245

(58) Field of Classification Search
USPC ................. 382/100, 103–107, 162, 168, 173, 382/181, 189, 199, 203, 232, 253, 274, 276, 382/291, 305, 312; 396/12; 362/35; 700/245, 700/244
See application file for complete search history.

(56) References Cited

U.S. PATENT DOCUMENTS

| | | | | | |
|---|---|---|---|---|---|
| 4,319,306 | A * | 3/1982 | Stanuch | .......................... | 362/35 |
| 5,589,901 | A * | 12/1996 | Means | ............................ | 396/12 |
| 8,352,072 | B2 * | 1/2013 | Gal et al. | ...................... | 700/245 |
| 2005/0234592 | A1 * | 10/2005 | McGee et al. | ................ | 700/245 |
| 2006/0015215 | A1 * | 1/2006 | Howard et al. | ............... | 700/245 |

* cited by examiner

*Primary Examiner* — Seyed Azarian
(74) *Attorney, Agent, or Firm* — Altis Law Group, Inc.

(57) ABSTRACT

In a method for controlling a searchlight using a control apparatus, images of a target area are captured in real-time using an image capturing device when the searchlight is powered on. The captured images are analyzed to detect whether a moving object is in the target area, and position information of the moving object in a current image of the target area are calculated when the moving object is detected. The searchlight is controlled to aim at and illuminate the moving object using an actuating device according to the position information of the moving object.

9 Claims, 4 Drawing Sheets

SEARCHLIGHT CONTROL APPARATUS AND METHOD

BACKGROUND

1. Technical Field

Embodiments of the present disclosure generally relate to searchlights, and more particularly, to a control apparatus and method for controlling searchlights.

2. Description of Related Art

Searchlights are widely used for local illumination. A typical searchlight, such as, one used on a stage, may require that it be manually controlled to illuminate a target object according to the movements of the target object. Such manual control method is inconvenient. In other cases, a searchlight may be powered to constantly rotate or tilt. However, in this method, the searchlight can not move according to movements of the target object.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
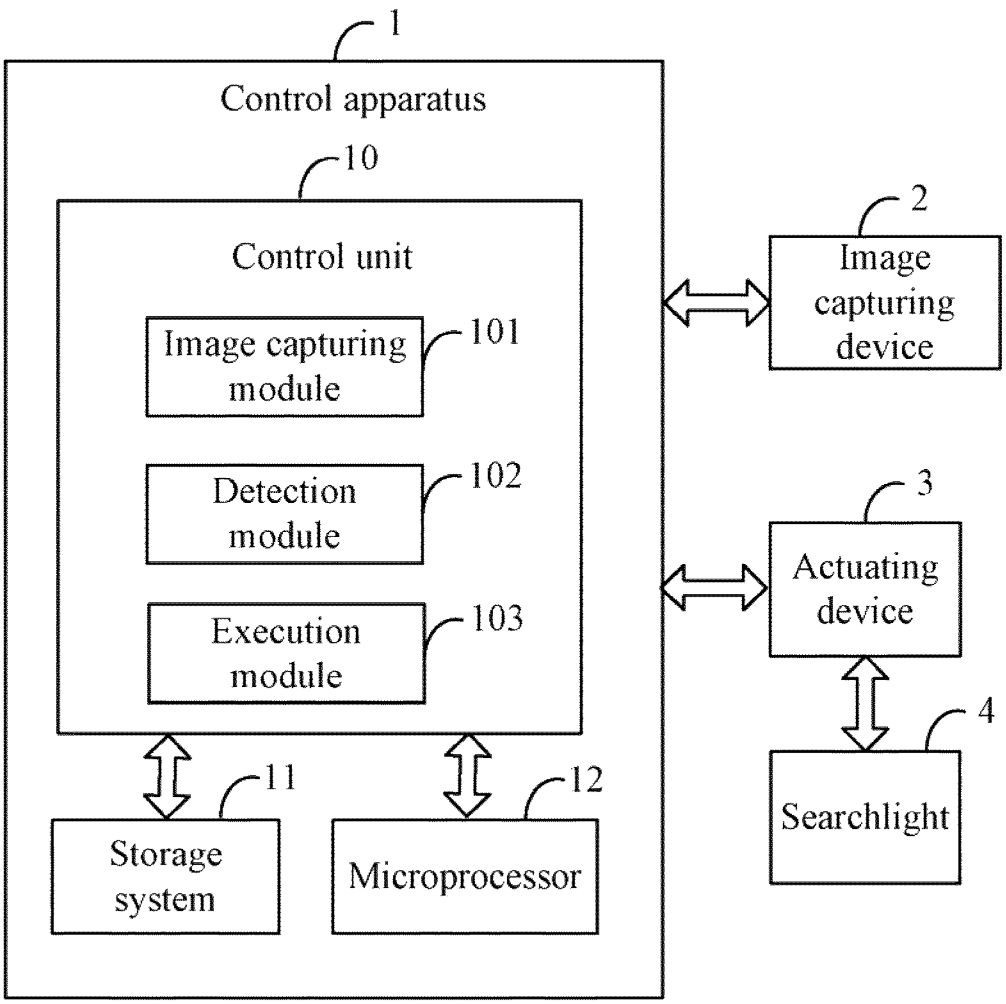
FIG. 1 is a block diagram of one embodiment of a control apparatus.

FIG. 1 is a block diagram of one embodiment of a control apparatus 1. In the embodiment, the control apparatus 1 electronically communicates with an image capturing device 2, as well as an actuating device 3 that controls a searchlight 4. The control apparatus 1 includes a control unit 10, a storage system 11, and a microprocessor 12. The control apparatus 1 may be a computer, or a computing device. It should be apparent that FIG. 1 is only one example of the control apparatus 1 and that it can be comprised of more or less components in other embodiments, or a different configuration of the various components.

Figure 2:
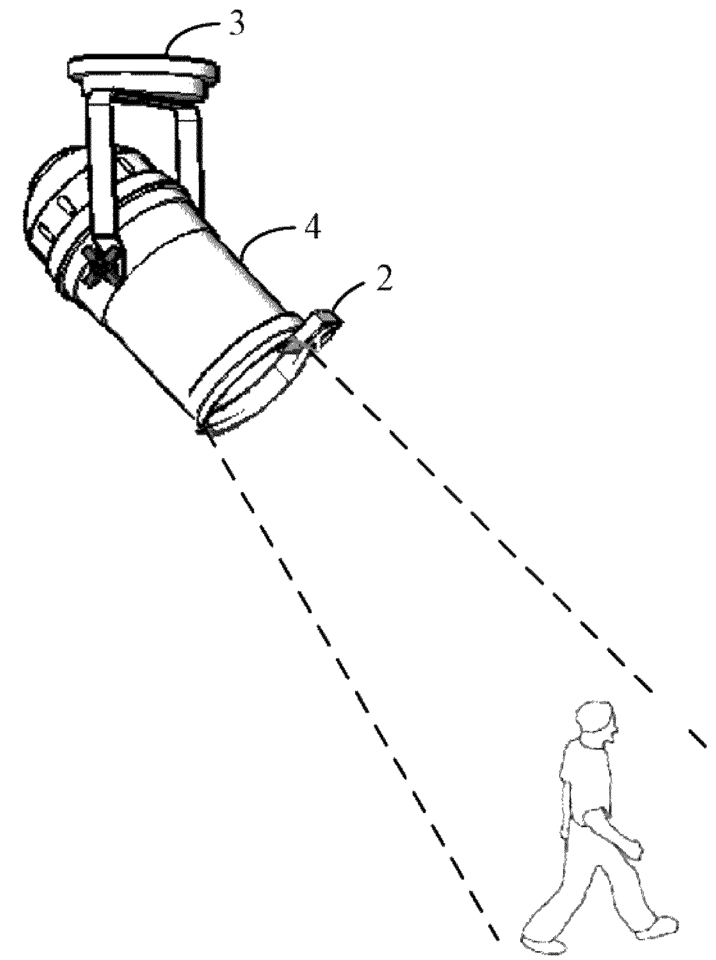
FIG. 2 is a schematic diagram illustrating one example of placement of a searchlight, an actuating device, and an image capturing device of FIG. 1.

In the embodiment, the image capturing device 2 is mechanically located on the searchlight 4, so that the image capturing device 2 can move with the searchlight 4 to capture images of a target area to be monitored. The captured images are analyzed by the control apparatus 1 to detect moving objects in the target area. The searchlight 4 is electronically connected with the actuating device 2, which may be a servomotor to drive the searchlight 4 to move, such as pan, tilt, or rotate, so that the searchlight 4 can be aimed at and illuminate any place of the target area where the moving objects are detected. In one example, as shown in FIG. 2, if the control apparatus 1 detects a person entering the target area according to analysis of the images, the searchlight 4 may be driven by the actuating device 3 to aim at and illuminate the person.

The storage system 11 stores one or more programs, such as programs of an operating system, and other applications of the control apparatus 1. In one embodiment, the storage system 11 may be random access memory (RAM) for temporary storage of information, and/or a read only memory (ROM) for permanent storage of information. In other embodiments, the storage system 11 may also be an external storage device, such as a hard disk, a storage card, or a data storage medium. The microprocessor 12 executes computerized operations of the control apparatus 1 and other applications to provide functions of the control apparatus 1.

The control unit 10 may include a plurality of functional modules comprising one or more computerized instructions that are stored in the storage system 11 or a computer-readable medium of the control apparatus 1, and executed by the microprocessor 12 to perform operations of the control apparatus 1. In the embodiment, the control unit 10 includes an image capturing module 101, a detection module 102, and an execution module 103. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The image capturing module 101 is operable to capture images of the target area in real-time using the image capturing device 2, when the searchlight 4 is powered on. In the embodiment, the searchlight 4 is initially located at a predetermined position of the target area, so that the image capturing device 2 can cover the whole target area.

The detection module 102 is operable to analyze the captured images to detect whether a moving object is in the target area. Details of the detection of the moving object are described as follows. First, the detection module 102 obtains a first image and a second image of the target area that are consecutively captured by the image capturing device 2. Second, the detection module 102 calculates characteristic values of the first image and the second image. Third, the detection module 102 matches the first image and the second image via an autocorrelation of the characteristic values of the first image and the second image, to extract a different region with different characteristic values in both of the first image and the second image. In the embodiment, the different region may be regarded as the moving object. If the detection module 102 does not extract a different region between the first image and the second image, the detection module 102 determines that there is no moving object in the target area. The characteristic values may be color characteristic values, such as RGB values, of the first image and the second image.

The detection module 102 is further operable to calculate position information of the moving object in a current image of the target area. In one example, the detection module 102 may use a rectangular region to locate the moving object (e.g., M1 of FIG. 4), then calculates coordinate values of a center of the rectangular region as the position information of the moving object. The coordinate values of the center of the rectangular region may be calculated based on a coordinate system of the current image.

The execution module 103 is operable to control the searchlight 4 to aim at and illuminate the moving object using the actuating device 3 according to the position information of the moving object. Details are provided as the following description of the FIG. 4.

Figure 4:
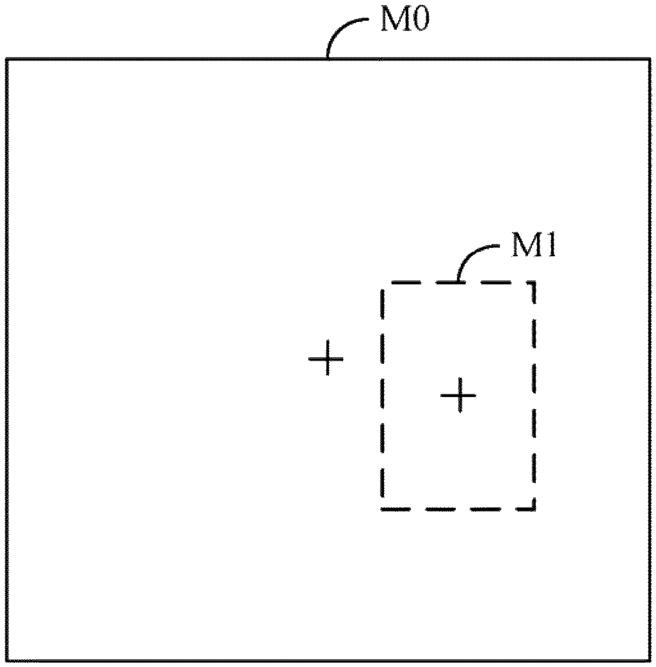
FIG. 4 is a schematic diagram illustrating one example of a current image of a target area captured by the image capturing device.

As shown in FIG. 4, "M0" represents the current image of the target area, and "M1" represents the rectangular region in which the moving object is located. A sign "+" in "M1" is a center of the rectangular region "M0". And another sign "+"

outside of "M1" is a center of the current image. The detection module 102 determines that the center of "M0" is located at a down and right hand side of the center of "M0" according to the position information of the moving object. Thereupon, the execution module 103 may control the searchlight 4 to rotate to the right direction and tilt to the down direction. Meanwhile, the image capturing device 2 may consecutively capture real-time images of the target area while the searchlight 4 is moving, and the execution module 103 may stop driving the searchlight 4 when the center of "M1" is coincident with a center of a currently captured image of the target area.

Additionally, the detection module 102 is further operable to consecutively detect whether the moving object disappears from the images of the target area that are captured by the image capturing device 2 in real-time. When the moving object disappears, the execution module 103 further controls the searchlight 4 to return to the predetermined position using the actuating device 3.

Figure 3:
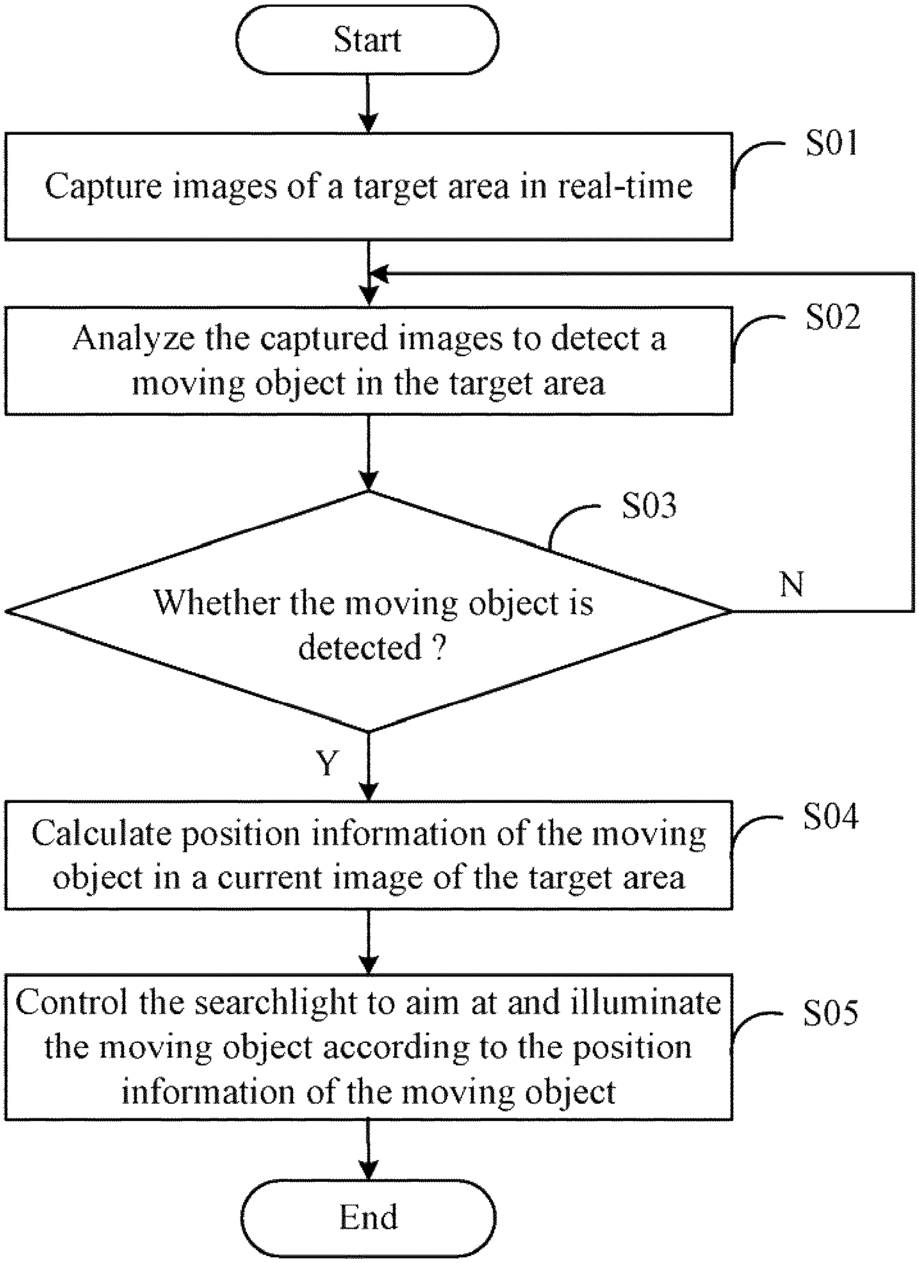
FIG. 3 is a flowchart of one embodiment of a searchlight control method by using the apparatus of FIG. 1.

FIG. 3 is a flowchart of one embodiment of a searchlight control method using the control apparatus 1 of FIG. 1. Depending on the embodiment, additional blocks may be added, others removed, and the ordering of the blocks may be changed.

In block S01, the image capturing module 101 captures images of a target area in real-time using the image capturing device 2 when the searchlight 4 is powered on. In the embodiment, the searchlight 4 is initially located at a predetermined position, so that the image capturing device 2 can cover the whole target area.

In block S02, the detection module 102 analyzes the captured images to detect a moving object in the target area in real-time.

In block S03, the detection module 102 determines whether the moving object is detected in the target area according to the analysis result. If the moving object is detected in the target area, block S04 is implemented. Otherwise, if no moving object is detected in the target area, block S02 is repeated.

In block S04, the detection module 102 calculates position information of the moving object in a current image of the target area.

In block S05, the execution module 103 controls the searchlight 4 to aim at and illuminate the moving object using the actuating device 3 according to the position information of the moving object.

In the embodiment, the detection module 102 consecutively detects whether the moving object disappears from the images of the target area that are captured by the image capturing device 2 in real-time. When the moving object disappears, the execution module 103 controls the searchlight 4 to return to the predetermined position using the actuating device 3.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for controlling a searchlight using a control apparatus that electronically communicates with an image capturing device and an actuating device, the method comprising:

capturing images of a target area in real-time using the image capturing device when the searchlight is powered on; analyzing the captured images to detect whether a moving object is in the target area; calculating position information of the moving object in a current image of the target area when the moving object is detected;

controlling the searchlight to aim at and illuminate the moving object using the actuating device according to the position information of the moving object;

wherein the searchlight is initially located at a predetermined position when the searchlight is powered on, and detecting whether the moving object disappears from the images of the target area that are captured by the image capturing device in real-time; and controlling the searchlight to return to the predetermined position using the actuating device when the moving object disappears from the images of the target area.

2. The method according to claim 1, wherein the searchlight is electronically connected with the actuating device.

3. The method according to claim 1, wherein the image capturing device is mechanically located on the searchlight.

4. A control apparatus for controlling a searchlight, the apparatus electronically communicating with an image capturing device and an actuating device, and comprising: a microprocessor; a storage system; and one or more programs stored in the storage system and being executable by the microprocessor, the one or more programs comprising: an image capturing module operable to capture images of a target area in real-time using the image capturing device when the searchlight is powered on; a detection module operable to analyze the captured images to detect whether a moving object is in the target area, and calculate position information of the moving object in a current image of the target area when the moving object is detected; and an execution module operable to control the searchlight to aim at and illuminate the moving object using the actuating device according to the position information of the moving object;

wherein the searchlight is initially located at a predetermined position when the searchlight is powered on, and the control apparatus, wherein the detection module is further operable to detect whether the moving object disappears from the images of the target area that are captured by the image capturing device in real-time, wherein the execution module is further operable to control the searchlight to return to the predetermined position using the actuating device when the moving object disappears from the images of the target area.

5. The control apparatus according to claim 4, wherein the searchlight is electronically connected with the actuating device.

6. The control apparatus according to claim 4, wherein the image capturing device is mechanically located on the searchlight.

7. A non-transitory storage medium storing a set of instructions, the set of instructions capable of being executed by a microprocessor of a control apparatus that electronically communicates with an image capturing device and an actuating device, to perform a method for controlling a searchlight, the method comprising: capturing images of a target area in real-time using the image capturing device when the searchlight is powered on; analyzing the captured images to detect whether a moving object is in the target area; calculating position information of the moving object in a current image of the target area when the moving object is detected; controlling the searchlight to aim at and illuminate the moving object using the actuating device according to the position information of the moving object;

wherein the searchlight is initially located at a predetermined position when the searchlight is powered on, wherein the method further comprises: detecting whether the moving object disappears from the images of the target area that are captured by the image capturing device in real-time;

and controlling the searchlight to return to the predetermined position using the actuating device when the moving object disappears from the images of the target area.

8. The storage medium as claimed in claim 7, wherein the searchlight is electronically connected with the actuating device.

9. The storage medium as claimed in claim 7, wherein the image capturing device is mechanically located on the searchlight.

* * * * *